(12) United States Patent
Zehner et al.

(10) Patent No.: US 7,186,457 B1
(45) Date of Patent: Mar. 6, 2007

(54) CELLULOSIC COMPOSITE COMPONENT

(75) Inventors: Burch E. Zehner, Gahanna, OH (US); Matthew F. Kollar, Powell, OH (US); Jeffrey R. Brandt, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 272 days.

(21) Appl. No.: 10/307,083

(22) Filed: Nov. 27, 2002

(51) Int. Cl.
*B32B 5/16* (2006.01)

(52) U.S. Cl. ............... 428/326; 428/511; 428/516; 428/526; 428/220; 428/332; 428/401

(58) Field of Classification Search ............ 428/319.9, 428/326, 317.9, 526, 318.6, 513, 319.7, 512, 428/319.3, 511, 516, 220, 332, 401
See application file for complete search history.

(56) References Cited

U.S. PATENT DOCUMENTS

| | | | |
|---|---|---|---|
| 2,072,687 A | 3/1937 | Robinson | |
| 2,153,316 A | 4/1939 | Sherrard et al. | |
| 2,156,160 A | 4/1939 | Olson et al. | |
| 2,188,396 A | 1/1940 | Semon | 18/55 |
| 2,306,274 A | 12/1942 | Meiler | |
| 2,316,283 A | 4/1943 | Piperoux et al. | |
| 2,451,558 A | 10/1948 | Schlosser et al. | |
| 2,489,373 A | 11/1949 | Gilman | 260/37 |
| 2,519,442 A | 8/1950 | Delorme et al. | 260/37 |
| 2,535,373 A | 12/1950 | Shearer et al. | |
| 2,558,378 A | 6/1951 | Petry | 260/41 |
| 2,635,976 A | 4/1953 | Meiler et al. | 154/132 |
| 2,680,102 A | 6/1954 | Becher | 260/17.3 |
| 2,759,837 A | 8/1956 | Roberts | |
| 2,789,903 A | 4/1957 | Lukman et al. | 92/21 |
| 2,935,763 A | 5/1960 | Newman et al. | 18/55 |
| 2,976,164 A | 3/1961 | Glab | |
| 3,287,480 A | 11/1966 | Wechsler et al. | 264/122 |
| 3,308,218 A | 3/1967 | Etal | 264/121 |
| 3,309,444 A | 3/1967 | Schueler | 264/109 |
| 3,492,388 A | 1/1970 | Inglin-Knüsel | 264/129 |
| 3,493,527 A | 2/1970 | Schueler | 260/17.2 |
| 3,533,906 A | 10/1970 | Reiniger | |
| 3,562,373 A | 2/1971 | Logrippo | 264/118 |
| 3,645,939 A | 2/1972 | Gaylord | 260/17.4 GC |

(Continued)

FOREIGN PATENT DOCUMENTS

CH 580130 A5 9/1976

(Continued)

OTHER PUBLICATIONS

Bendtsen et al., Mechanical Properties of Wood, pp. 4-2 to 4-44.

(Continued)

*Primary Examiner*—Merrick Dixon
(74) *Attorney, Agent, or Firm*—Standley Law Group LLP (57) ABSTRACT

A component such as a siding panel comprised of a PVC/wood flour composite. Another embodiment is a component such as a siding panel that is made from a PVC/CPE/wood flour composite. The cellulosic composite may be extruded through a die and then bent into the shape of the component. Optionally, a reinforcement backer (e.g., an expanded polystyrene foam panel) may be adhered to the cellulosic composite siding.

40 Claims, 1 Drawing Sheet

U.S. PATENT DOCUMENTS

| | | | |
|---|---|---|---|
| 3,671,615 A | 6/1972 | Price | 264/39 |
| 3,852,387 A | 12/1974 | Bortnick et al. | |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutillier et al. | 264/48 |
| 3,888,810 A | 6/1975 | Shinomura | 260/17.4 BB |
| 3,899,559 A | 8/1975 | Johanson et al. | 264/115 |
| 3,908,902 A | 9/1975 | Collins et al. | 238/83 |
| 3,922,328 A | 11/1975 | Johnson | 264/46.1 |
| 3,931,384 A | 1/1976 | Forquer et al. | 264/120 |
| 3,943,079 A | 3/1976 | Hamed | 260/17.4 BB |
| 3,954,555 A | 5/1976 | Kole et al. | 162/136 |
| 3,956,541 A | 5/1976 | Pringle | 428/2 |
| 3,956,555 A | 5/1976 | McKean | 428/106 |
| 3,969,459 A | 7/1976 | Fremont et al. | 264/109 |
| 4,005,162 A | 1/1977 | Bucking | 264/25 |
| 4,012,348 A | 3/1977 | Chelland et al. | 260/28.5 R |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,029,831 A | 6/1977 | Daunheimer | 427/264 |
| 4,045,603 A | 8/1977 | Smith | 428/2 |
| 4,048,101 A | 9/1977 | Nakamachi et al. | |
| 4,056,591 A | 11/1977 | Goettler et al. | 264/108 |
| 4,058,580 A | 11/1977 | Flanders | 264/113 |
| 4,071,479 A | 1/1978 | Broyde et al. | 260/2.3 |
| 4,071,494 A | 1/1978 | Gaylord | 260/42.14 |
| 4,091,153 A | 5/1978 | Holman | |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 CL |
| 4,115,497 A | 9/1978 | Halmø et al. | 264/115 |
| 4,145,389 A | 3/1979 | Smith | 264/40.7 |
| 4,157,415 A | 6/1979 | Lindenberg | 428/284 |
| 4,168,251 A | 9/1979 | Schinzel et al. | 260/17.4 R |
| 4,178,411 A | 12/1979 | Cole et al. | 428/310 |
| 4,181,764 A | 1/1980 | Totten | 428/155 |
| 4,187,352 A | 2/1980 | Klobbie | 521/79 |
| 4,191,798 A | 3/1980 | Schumacher et al. | 428/95 |
| 4,203,876 A | 5/1980 | Dereppe et al. | 260/17.4 R |
| 4,228,116 A | 10/1980 | Colombo et al. | 264/119 |
| 4,239,679 A | 12/1980 | Rolls et al. | 260/42.49 |
| 4,241,133 A | 12/1980 | Lund et al. | 428/326 |
| 4,244,903 A | 1/1981 | Schnause | 264/68 |
| 4,248,743 A | 2/1981 | Goettler | 260/17.4 BB |
| 4,248,820 A | 2/1981 | Haataja | 264/113 |
| 4,250,222 A | 2/1981 | Mavel et al. | 428/285 |
| 4,263,184 A | 4/1981 | Leo et al. | 260/17.4 CL |
| 4,263,196 A | 4/1981 | Schumacher et al. | 260/33.6 |
| 4,272,577 A | 6/1981 | Lyng | 428/112 |
| 4,273,688 A | 6/1981 | Porzel et al. | 260/17.4 R |
| 4,277,428 A | 7/1981 | Luck et al. | 264/118 |
| 4,290,988 A | 9/1981 | Nopper et al. | 264/112 |
| 4,297,408 A | 10/1981 | Stead et al. | 428/240 |
| 4,303,019 A | 12/1981 | Haataja et al. | 108/51.1 |
| 4,305,901 A | 12/1981 | Prince et al. | 264/176 R |
| 4,317,765 A | 3/1982 | Gaylord | 523/204 |
| 4,323,625 A | 4/1982 | Coran et al. | 428/361 |
| 4,376,144 A | 3/1983 | Goettler | 428/36 |
| 4,382,108 A | 5/1983 | Carroll et al. | 428/254 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,430,468 A | 2/1984 | Schumacher | 524/109 |
| 4,440,708 A | 4/1984 | Haataja et al. | 264/109 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,562,218 A | 12/1985 | Fornadel et al. | 524/15 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,645,631 A | 2/1987 | Hegenstaller et al. | 264/69 |
| 4,659,754 A | 4/1987 | Edwards et al. | 523/214 |
| 4,663,225 A | 5/1987 | Farley et al. | 428/290 |
| 4,686,251 A | 8/1987 | Ostermann et al. | |
| 4,687,793 A | 8/1987 | Motegi et al. | 523/200 |
| 4,708,623 A | 11/1987 | Aoki et al. | |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,746,688 A | 5/1988 | Bistak et al. | 523/220 |
| 4,769,109 A | 9/1988 | Tellvik et al. | 162/123 |
| 4,769,274 A | 9/1988 | Tellvik et al. | 428/218 |
| 4,783,493 A | 11/1988 | Motegi et al. | 524/13 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,800,214 A | 1/1989 | Waki et al. | 521/84.1 |
| 4,801,495 A | 1/1989 | van der Hoeven | 428/286 |
| 4,818,604 A | 4/1989 | Tock | 428/319.9 |
| 4,820,749 A | 4/1989 | Beshay | 523/203 |
| 4,844,766 A | 7/1989 | Held | |
| 4,851,458 A | 7/1989 | Hopperdietzel | 523/205 |
| 4,865,788 A | 9/1989 | Davis | 264/112 |
| 4,889,673 A | 12/1989 | Takimoto | 264/118 |
| 4,894,192 A | 1/1990 | Warych | 264/68 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,935,182 A | 6/1990 | Ehner et al. | 264/112 |
| 4,960,548 A | 10/1990 | Ikeda et al. | 264/40.4 |
| 4,968,463 A | 11/1990 | Levasseur | 264/40.1 |
| 4,973,440 A | 11/1990 | Tamura et al. | 264/114 |
| 4,978,489 A | 12/1990 | Radvan et al. | 264/118 |
| 4,988,478 A | 1/1991 | Held | 264/518 |
| 5,002,713 A | 3/1991 | Palardy et al. | 264/109 |
| 5,008,310 A | 4/1991 | Beshay | 524/13 |
| 5,009,586 A | 4/1991 | Pallmann | 425/311 |
| 5,049,334 A | 9/1991 | Bach | 264/122 |
| 5,055,247 A | 10/1991 | Ueda et al. | |
| 5,057,167 A | 10/1991 | Gersbeck | 156/62.2 |
| 5,064,592 A | 11/1991 | Ueda et al. | 264/112 |
| 5,075,057 A | 12/1991 | Hoedl | 264/115 |
| 5,075,359 A | 12/1991 | Castagna et al. | 524/13 |
| 5,078,937 A | 1/1992 | Eela | 264/109 |
| 5,082,605 A | 1/1992 | Brooks et al. | 264/40.6 |
| 5,087,400 A | 2/1992 | Theuveny | 264/115 |
| 5,088,910 A | 2/1992 | Goforth et al. | 425/142 |
| 5,096,046 A | 3/1992 | Goforth et al. | 198/604 |
| 5,096,406 A | 3/1992 | Brooks et al. | 425/205 |
| 5,110,663 A | 5/1992 | Nishiyama et al. | 428/195 |
| 5,120,776 A | 6/1992 | Raj et al. | 524/13 |
| 5,151,238 A | 9/1992 | Earl et al. | |
| 5,153,241 A | 10/1992 | Beshay | 524/8 |
| 5,194,461 A | 3/1993 | Bergquist et al. | 524/13 |
| 5,219,634 A | 6/1993 | Aufderhaar | 428/156 |
| 5,272,000 A | 12/1993 | Chenoweth et al. | 428/283 |
| 5,276,082 A | 1/1994 | Forry et al. | 524/504 |
| 5,284,710 A | 2/1994 | Hartley et al. | 428/421 |
| 5,288,772 A | 2/1994 | Hon | 524/35 |
| 5,302,634 A | 4/1994 | Mushovic | 523/219 |
| 5,369,147 A | 11/1994 | Mushovic | 523/219 |
| 5,387,381 A | 2/1995 | Saloom | |
| 5,393,536 A | 2/1995 | Brandt et al. | 425/112 |
| 5,406,768 A | 4/1995 | Giuseppe et al. | 52/730.4 |
| 5,422,170 A | 6/1995 | Iwata et al. | 428/218 |
| 5,423,933 A | 6/1995 | Horian | |

| | | | | | | |
|---|---|---|---|---|---|---|
| 5,435,954 A | 7/1995 | Wold .................. 264/115 | | 6,360,508 B1 | 3/2002 | Pelfrey et al. ............... 52/520 |
| 5,441,801 A | 8/1995 | Deaner et al. ............. 428/326 | | 6,362,252 B1 | 3/2002 | Prutkin ..................... 523/200 |
| 5,458,834 A | 10/1995 | Faber et al. ............... 264/109 | | 6,409,952 B1 | 6/2002 | Hacker et al. ............ 264/171.1 |
| 5,474,722 A | 12/1995 | Woodhams ............. 264/45.3 | | 6,423,257 B1 | 7/2002 | Stobart et al. ............... 264/145 |
| 5,480,602 A | 1/1996 | Nagaich .................. 264/122 | | 6,453,630 B1 | 9/2002 | Buhrts et al. ................ 52/177 |
| 5,486,553 A | 1/1996 | Deaner et al. ............... 524/13 | | 6,464,913 B1 | 10/2002 | Korney, Jr. ................. 264/102 |
| 5,497,594 A | 3/1996 | Giuseppe et al. .......... 52/730.4 | | 6,498,205 B1 | 12/2002 | Zehner ...................... 524/14 |
| 5,516,472 A | 5/1996 | Laver ....................... 264/118 | | 6,511,757 B1 | 1/2003 | Brandt et al. ............... 428/532 |
| 5,518,677 A | 5/1996 | Deaner et al. ............. 264/142 | | 6,531,010 B2 | 3/2003 | Puppin ..................... 156/88 |
| 5,532,065 A | 7/1996 | Gübitz .................... 428/480 | | 6,569,540 B1 | 5/2003 | Preston et al. ............. 428/537.1 |
| 5,537,789 A | 7/1996 | Minke et al. ................ 52/313 | | 6,578,368 B1 | 6/2003 | Brandt et al. ................. 62/63 |
| 5,539,027 A | 7/1996 | Deaner et al. ................ 524/13 | | 6,579,605 B2 * | 6/2003 | Zehner ................... 428/319.9 |
| 5,574,094 A | 11/1996 | Malucelli et al. ........... 525/54.3 | | 6,605,245 B1 | 8/2003 | Dubelsten et al. .......... 264/446 |
| 5,576,374 A | 11/1996 | Betso et al. ................. 524/451 | | 6,617,376 B2 | 9/2003 | Korney, Jr. ................. 524/13 |
| 5,585,155 A | 12/1996 | Heikkila et al. ............... 428/36 | | 6,632,863 B2 | 10/2003 | Hutchison et al. ........... 524/13 |
| 5,593,625 A | 1/1997 | Riebel et al. ................ 264/115 | | 6,637,213 B2 | 10/2003 | Hutchison et al. ............ 62/63 |
| 5,624,616 A | 4/1997 | Brooks | | 6,641,384 B2 | 11/2003 | Bosler et al. |
| 5,695,874 A | 12/1997 | Deaner et al. ............. 428/326 | | 6,662,515 B2 | 12/2003 | Buhrts et al. ................ 52/301 |
| 5,725,939 A | 3/1998 | Nishibori ................ 428/292.4 | | 6,680,090 B2 | 1/2004 | Godavarti et al. ............ 428/34 |
| 5,744,210 A | 4/1998 | Hofmann et al. | | 6,682,789 B2 | 1/2004 | Godavarti et al. ............ 428/34 |
| 5,773,138 A | 6/1998 | Seethamraju et al. ....... 428/326 | | 6,682,814 B2 | 1/2004 | Hendrickson et al. ....... 428/326 |
| 5,783,125 A | 7/1998 | Bastone et al. ............ 264/45.3 | | 6,685,858 B2 | 2/2004 | Korney, Jr. ................. 264/102 |
| 5,827,462 A | 10/1998 | Brandt et al. ............. 264/179 | | 6,708,504 B2 | 3/2004 | Brandt et al. ................. 62/63 |
| 5,827,607 A | 10/1998 | Deaner et al. ............. 428/326 | | 6,716,522 B2 | 4/2004 | Matsumoto et al. ........ 428/326 |
| 5,836,128 A | 11/1998 | Groh et al. .................. 52/580 | | 6,752,941 B2 | 6/2004 | Hills |
| 5,847,016 A | 12/1998 | Cope ....................... 521/84.1 | | 6,773,255 B2 | 8/2004 | Benz et al. |
| 5,858,522 A | 1/1999 | Turk et al. | | 6,780,359 B1 | 8/2004 | Zehner et al. ............... 264/115 |
| 5,866,054 A | 2/1999 | Dorchester et al. | | 6,844,049 B2 | 1/2005 | Amin-Javaheri |
| 5,866,264 A | 2/1999 | Zehner et al. ............. 428/481 | | 6,863,972 B2 | 3/2005 | Burger et al. ............. 428/319.3 |
| 5,869,138 A | 2/1999 | Nishibori | | 7,030,179 B2 | 4/2006 | Patterson et al. |
| 5,869,176 A | 2/1999 | Dorchester et al. | | 2001/0019749 A1 | 6/2001 | Godavarti et al. ......... 428/34.2 |
| 5,882,564 A | 3/1999 | Puppin .................. 264/177.16 | | 2001/0051242 A1 | 12/2001 | Godavarti et al. ......... 428/36.9 |
| 5,932,334 A * | 8/1999 | Deaner et al. ............. 428/292.4 | | 2001/0051243 A1 | 12/2001 | Godavarti et al. ......... 428/36.9 |
| 5,948,505 A | 9/1999 | Puppin ...................... 428/121 | | 2002/0015820 A1 | 4/2002 | Puppin ...................... 428/121 |
| 5,948,524 A | 9/1999 | Seethamraju et al. ....... 428/326 | | 2002/0038684 A1 | 4/2002 | Puppin ........................ 156/88 |
| 5,951,927 A | 9/1999 | Cope .......................... 264/54 | | 2002/0040557 A1 | 4/2002 | Felton ..................... 52/309.13 |
| 5,981,067 A | 11/1999 | Seethamraju et al. ....... 428/393 | | 2002/0066248 A1 | 6/2002 | Buhrts et al. ................. 52/301 |
| 5,985,429 A | 11/1999 | Plummer et al. ........... 428/220 | | 2002/0090471 A1 | 7/2002 | Burger et al. ................ 428/15 |
| 6,004,668 A | 12/1999 | Deaner et al. ............. 428/326 | | 2002/0092256 A1 | 7/2002 | Hendrickson et al. ........ 52/519 |
| 6,007,656 A | 12/1999 | Heikkila et al. ............. 156/180 | | 2002/0106498 A1 | 8/2002 | Deaner et al. ............. 428/292.4 |
| 6,011,091 A | 1/2000 | Zehner ...................... 524/13 | | 2002/0143083 A1 | 10/2002 | Korney, Jr. ................. 524/13 |
| 6,015,611 A | 1/2000 | Deaner et al. ............. 428/326 | | 2002/0166327 A1 | 11/2002 | Brandt et al. ................. 62/63 |
| 6,015,612 A | 1/2000 | Deaner et al. ............. 428/326 | | 2002/0174663 A1 | 11/2002 | Hutchison et al. ............. 62/62 |
| 6,035,588 A | 3/2000 | Zehner et al. ................ 52/98 | | 2002/0192401 A1 | 12/2002 | Matsumoto et al. .......... 428/15 |
| 6,054,207 A | 4/2000 | Finley ..................... 428/317.9 | | 2002/0192431 A1 | 12/2002 | Edgman ..................... 428/181 |
| 6,066,367 A | 5/2000 | Nishibori | | 2003/0025233 A1 | 2/2003 | Korney, Jr. ................. 264/102 |
| 6,066,680 A | 5/2000 | Cope ......................... 521/79 | | 2003/0087994 A1 | 5/2003 | Frechette ..................... 524/9 |
| 6,083,601 A | 7/2000 | Prince et al. | | 2003/0087996 A1 | 5/2003 | Hutchison et al. ............ 524/27 |
| 6,103,791 A * | 8/2000 | Zehner ...................... 524/13 | | 2004/0048055 A1 | 3/2004 | Branca |
| 6,106,944 A | 8/2000 | Heikkila et al. ............. 428/397 | | 2004/0071964 A1 | 4/2004 | Nesbitt |
| 6,117,924 A | 9/2000 | Brandt ....................... 524/13 | | 2004/0191494 A1 | 9/2004 | Nesbitt |
| 6,122,877 A | 9/2000 | Hendrickson et al. ........ 52/520 | | 2006/0068215 A2 | 3/2006 | Dolinar |
| 6,131,355 A | 10/2000 | Groh et al. ................. 52/592.1 | | | | |
| 6,133,348 A | 10/2000 | Kolla et al. ..................... 524/9 | | FOREIGN PATENT DOCUMENTS | | |
| 6,153,293 A | 11/2000 | Dahl et al. ................. 428/310.5 | | | | |
| 6,180,257 B1 | 1/2001 | Brandt et al. ............... 428/532 | | CL | 343-95 | 3/1995 |
| 6,207,729 B1 | 3/2001 | Medoff et al. ............. 523/129 | | CL | 3037-99 | 12/1999 |
| 6,210,616 B1 | 4/2001 | Suwanda ................... 264/151 | | DE | 2042176 | 4/1971 |
| 6,210,792 B1 | 4/2001 | Seethamraju et al. ....... 428/326 | | DE | 3801574 | 8/1989 |
| 6,248,813 B1 | 6/2001 | Zehner ...................... 524/13 | | DE | 4033849 | 10/1990 |
| 6,265,037 B1 | 7/2001 | Godavarti et al. ............ 428/34 | | DE | 4221070 | 12/1993 |
| 6,272,808 B1 | 8/2001 | Groh et al. ................. 52/592.1 | | DK | 140148 B | 6/1979 |
| 6,280,667 B1 | 8/2001 | Koenig et al. ................. 264/68 | | EP | 0269470 | 1/1988 |
| 6,284,098 B1 | 9/2001 | Jacobsen .................... 162/150 | | EP | 0586211 | 3/1994 |
| 6,295,777 B1 | 10/2001 | Hunter et al. ................. 52/519 | | EP | 0586212 | 3/1994 |
| 6,295,778 B1 | 10/2001 | Burt ......................... 52/592.6 | | EP | 0586213 | 3/1994 |
| 6,337,138 B1 | 1/2002 | Zehner et al. ............... 428/511 | | EP | 0668142 | 8/1995 |
| 6,341,458 B1 | 1/2002 | Burt ......................... 52/287.1 | | EP | 0747419 | 12/1996 |
| 6,342,172 B1 | 1/2002 | Finley ..................... 264/45.3 | | FR | 2270311 | 2/1974 |
| 6,344,504 B1 | 2/2002 | Zehner et al. ............... 524/14 | | FR | 2365017 | 4/1978 |
| 6,346,160 B1 | 2/2002 | Puppin ...................... 156/88 | | FR | 2445885 | 8/1980 |
| 6,357,197 B1 | 3/2002 | Serino et al. ............... 52/738.1 | | FR | 2564374 | 11/1985 |
| 6,358,585 B1 | 3/2002 | Wolff ..................... 428/36.6 | | GB | 1298823 A | 12/1972 |

| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| JP | 2000-017245 A | 1/2000 |
| JP | 2000-109589 A | 4/2000 |
| JP | 2002-086544 A | 3/2002 |
| JP | 2002-113768 A | 4/2002 |
| JP | 2002-137333 A | 5/2002 |
| JP | 2002-144489 A | 5/2002 |
| WO | WO 90/08020 | 7/1990 |
| WO | WO 99/11444 | 3/1999 |
| WO | WO 00/11282 | 3/2000 |
| WO | WO 00/34017 | 6/2000 |
| WO | WO 00/39207 | 7/2000 |
| WO | WO 01/66873 | 9/2001 |
| WO | WO 02/057692 | 7/2002 |
| WO | WO 02/079317 | 10/2002 |
| WO | WO 03/091642 | 11/2003 |
| WO | 2004/083541 A2 | 9/2004 |
| WO | 2004/083541 | 11/2004 |

OTHER PUBLICATIONS

Bibliography of Solid Phase Extrusion, pp. 187-195.
Brzoskowski et al., Air-Lubricated Die for Extrusion of Rubber Compounds, Rubber Chemistry and Technology, vol. 60, p. 945-956.
Collier et al., High Strength Extrudates by Melt Transformation Coextrusion, ANTEC, 1987, pp. 497-502.
Collier et al.. Streamlined Dies and Profile Extrusion, ANTEC, 1987, pp. 203-206.
Company News, Plastics Industry News, May 1994, pp. 70-71.
Dalväg et al., The Efficient of Cellulosic Fillers in Common Thermoplastics. Part II. Filling with Processing Aids and Coupling Agents, 1985, vol. 11, pp. 9-38.
Fiberloc Polymer Composites, B.F. Goodrich, Geon Vinyl Division, section 1, pp. 2-15.
Fill Thermoplastics with Wood, Modern Plastics, May 1974, pp. 54-55.
Fillers for Thermoplastics: Beyond Resin Stretching, Modern Plastics International, Oct. 1976, pp. 12-15.
From Sweden: Extruded Interior Trim Made of PVC and Wood Flour, Plastic Buiding Construction, vol. 9 No. 5, 1986, pp. 5-6.
Henrici-Olive et al., Integral/Structural Ploymer Foams, Technology, Properties and Applications, Springer-Verlag, pp. 111-122.
Klason et al., The Efficiency of Cellulosic Fillers in Common Thermoplastics. Part 1. Filling without Processing Aids or Coupling Agents, Polymeric Materials, 1984, vol. 10, pp. 159-187.
Kokta et al., Composites of Poly(Vinyl Chloride) and Wood Fibers. Part II: Effect of Chemical Treatment, Polymer Composites, Apr. 1990, pp. 84-89.
Kokta et al., Composites of Polyvinyl Chloride-Wood Fibers. I. Effect of Isocyanate as a Bonding Agent, Polym.-Plast. Technol. Eng., 1990, 29(1&2), pp. 87-118.
Kokta et al., Composites of Polyvinyl Chloride-Wood Fibers. III. Effect of Silane as Coupling Agent, Journal of Vinyl Technology, Sep. 1990, pp. 146-153.
Kokta et al., Use of Grafted Wood Fibers in Thermoplastic Composites v. Polystyrene, Centre de recherche en pâtes et papiers, Université du Québec à Trois-Rivières, Canada.
Kokta et al., Use of Wood Fibers in Thermoplastic Composites, Polymer Composites, Oct. 1983, pp. 229-232.
Maldas et al., Composites of Polyvinyl Chloride-Wood Fibers: IV. Effect of the Nature of Fibers, Journal of Vinyl Technology, Jun. 1989, pp. 90-98.
Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529-539 (1989).
Myers et al., "Wood flour and polypropylene or high-density polyethylene composites: influence of maleated polypropylene concentration and extrusion temperature on properties", "Wood Fiber/Polymer Composites: Fundamental Concepts, Processes, and Material Options", pp. 49-56.
Myer et al., Bibliography: Composites from Plastics and Wood-Based Fillers, USDA Forest Products Laboratory, Madison, WI, pp. 1-27 odds (1991).
Myers et al., Effects of Composition and Polypropylene Melt Flow on Polypropylene-Waste Newspaper Composites, ANTEC, 1984, pp. 602-604.
Pornnimit et al., Extrusion of Self-Reinforced Polyethylene, Advances in Polymer Technology, vol. 11, No. 2, pp. 92-98.
Raj et al., Use of Wood Fiber as Filler in Common Thermoplastics: Studies on Mechanical Properties, Science and Engineering of Composite Materials, vol. 1 No. 3, 1989, pp. 85-98.
Raj et al., Use of Wood Fibers in Thermoplastics. VII. The Effect of Coupling Agents in Polyethylene-Wood Fiber Composites, Journal of Applied Polymer Science, vol. 37, pp. 1089-1103 (1989).
Resin Stretching: Accent on Performance, Modern Plastic International, Jan. 1974, pp. 58-60.
Rogalski et al., Poly(Vinyl-Chloride) Wood Fiber Composites, ANTEX, 1987, pp. 1436-1441.
Sonwood Outline, Apr., 1975.
Sonwood: a new PVC wood-flour alloy for Extrusions and other Plastic Processing Techniques, Sonesson Plast AB, Malmo, Sweden.
Thomas et al., Wood Fibers for Reinforcing Fillers for Polyolefins, ANTEC, 1984, pp. 687-689.
Wood Filled PVC, Plastics Industry News, Jul. 1996, p. 6.
Woodhams et al., Wood Fibers for Reinforcing Fillers for Polyolefins, Polymer Engineering and Science, Oct. 1984, pp. 1166-1171.
Yam et al., Composites from Compounding Wood Fibers With Recycled High Density Polyethylene, Polymer Engineering and Science, mid-Jun. 1990, pp. 693-699, vol. 30, No. 11.
Yuskova, et al., Interaction of Components in Poly(Vinyl Choloride) Filled in Polymetization, Makroniol Chem., Macromol. Symp. 29, 315-320 (1989).
Zadorecki et al., Future Prospects for Wood Cellulose as Reinforcement In Organic Polymer Composites, Polymer Composites, Apr. 1989, pp. 69-77.
ASTM, "Standard Terminology Relating to Wood-Base Fiber and Particle Panel Material", 1995 Annual Book of ASTM Standards, vol. 04.10, Oct. 1986, pp. 214-216.
Campbell, J. M. et al., "The Reinforcement of Thermoplastic Elastomers With Santoweb Fibre", Short Fibre Reinforced Thermoplastics, pp. 14/1-14/10.
Doroudiani, S. et al., "Structure and Mechanical Properties Study of Foamed Wood Fiber/Polyethylene Composites", ANTEC, 1997, pp. 2046-2050.
Ein Engineering Inc., "Making Wood From Waste Wood and Waste Plastic Using EIN Technology", EIN Plastic & Wood Recycling System Catalog, 1999, 16 pages.
Ein Engineering Inc., "Wood-like Material Superior to Real Wood", 5 pages.
English, B. et al., "Wastewood-Derived Fillers for Plastics", The Fourth International Conference on Woodfiber-Plastic Composites, 1997, pp. 309-324.
Forest Products Laboratory, "Wood Handbook: Wood as an Engineering Material", Agriculture Handbook 72, United States Department of Agriculture Forest Service, 1974, 2 pages.
Gatenholm, P. et al., "The Effect of Chemical Composition of Interphase on Dispersion of Cellulose Fibers in Polymers. I. PVC-Coated Cellulose in Polystyrene", Journal of Applied Polymer Science, vol. 49, 1993, pp. 197-208.
Kowalska, E. et al., "Modification of Recyclates of Polyethylene and Poly(Vinyl Chloride) with Scrap Paper Cellulose Fibres", Polymer Recycling, vol. 6, Nos. 2/3, 2001, pp. 109-118.
Lightsey, G.R., "Organic Fillers for Thermoplastics", Polymer Science and Technology, vol. 17, Aug. 1981, pp. 193-211.
Maloney, T. M., "Modern Particleboard & Dry-Process Fiberboard Manufacturing", Miller Freeman Publications, 1977, 6 pages.
Panshin, A. J. et al., "Forest Products", Wood Flour, Chapter 11, 1950, pp. 232-239.

Redbook, "For Resin Producers, Formulators, and Compounders", Plastics Compounding, 1992/93, 2 pages.

Raj, R. G. et al., "The Influence of Coupling Agents on Mechanical Properties of Composites Containing Cellulose Fillers", Marcel Dekker, Inc., 1990, pp. 339-353.

Reineke, L. H., "Wood Flour", U.S. Department of Agriculture Forest Service, U.S. Forest Service Research Note FPL-0113, Jan. 1966, 7 pages.

Robson, D. et. al., "A Comparison of Wood and Plant Fiber Properties", Woodfiber-Plastic Composities, 1995, pp. 41-46.

Royal Group Technologies, Inc., "New Composite Building Material Adds the Right Mix of Beauty and Brawn to Upscale Homes", www.royalgrouptech.com, printed Aug. 18, 2005, 3 pages.

Schneider, J. P. et al., "Biofibers as Reinforcing Fillers in Thermoplastic Composites", ANTEC, 1994, 6 pages.

Schut, J., "Compatibilizing Mixed Post-Consumer Plastics", Plastics Formulating & Compounding, Mar./Apr. 1997, p. 43.

Simonsen, J. et al., "Wood-Fiber Reinforcement of Styrene-Maleic Anhydride Copolymers", J. Appl. Polm. Sci. 68, No. 10, Jun. 6, 1998, pp. 1567-1573.

Stark, N. M. et al., "Effect of Particle Size on Properties of Wood-Flour Reinforced Polypropylene Composites", The Fourth International Conference on Woodfiber-Plastic Composites, 1997, pp. 134-143.

Stark, N. M. et al., "Photostabilization of Wood Flour Filled HDPE Composites", ANTEC, May 5-9, 2002, pp. 2209-2013.

Stark, N. M., "Wood Fiber Derived From Scrap Pallets Used In Polypropylene Composites", Forest Products Journal, vol. 49, No. 6, Jun. 1999, pp. 39-46.

Suchsland, O. et al., "Fiberboard Manufacturing Practices in the United States", Agriculture Handbook No. 640, United States Department of Agriculture Forest Service, 1986. 4 pages.

* cited by examiner

CELLULOSIC COMPOSITE COMPONENT

BACKGROUND AND SUMMARY OF THE INVENTION

The present invention relates generally to cellulosic composites and, more particularly, to cellulosic composite components such as siding panels. The present invention will be described primarily with reference to wood flour/polyvinyl chloride (PVC) composites. For instance, the present invention includes several different formulations and material composites including, but not limited to, PVC/chlorinated polyethylene (CPE) blends that include an inorganic filler in addition to the cellulosic material.

Conventional siding products are commonly made from aluminum, vinyl, or other similar materials. However, siding products made from these materials may not provide the desired aesthetic and physical characteristics. Moreover, some housing developments may not allow the use of siding made from these materials. For instance, some housing developments may require building materials such as brick, stone, stucco, cedar, or cementious siding.

In light of the shortcomings of vinyl and aluminum siding, a need exists for an improved siding product. For instance, there is a need for durable and weatherable cellulosic composite siding that exhibits the look and feel of natural wood such that it may be utilized in these limited housing developments. In addition, there is a need for cellulosic composite siding that may be stained, painted, colored, and capped. Furthermore, there is a need for cellulosic composite siding that provides the desired characteristics of toughness and stiffness as well as improved thermal and noise insulating properties.

An exemplary embodiment of the present invention may satisfy some or all of these needs. In one exemplary embodiment of the present invention, a siding panel is comprised of a PVC/wood flour composite. Another embodiment of the present invention includes a siding panel that is made from a PVC/CPE/wood flour composite. Optionally, a reinforcement backer (e.g., an expanded polystyrene foam panel) may be adhered to the cellulosic composite siding.

As compared to natural woods, a cellulosic composite of the present invention may offer superior resistance to wear and tear. In particular, the composite may have enhanced resistance to moisture. In fact, it is well known that the retention of moisture is a primary cause of the warping, splintering, and discoloration of natural woods. Moreover, the composite may be sawed, sanded, shaped, turned, fastened, and finished in a similar manner as natural woods.

Although the cellulosic composite of the present invention may be particularly useful for making siding, it should be recognized that the cellulosic composite may also be useful for a variety of other applications. For instance, the cellulosic composite of the present invention may be useful for making siding accessories, interior and exterior decorative house moldings, picture frames, furniture components, deck components, deck railings, window moldings, window components, window lineals, door components, roof components, fence components, fence posts, fence rails, floor components, and other suitable indoor and outdoor items. In addition, the cellulosic composite may also be used to make other types of products that are commonly made from wood, synthetic wood, metal, or plastic.

In addition to the novel features and advantages mentioned above, other features and advantages of the present invention will be readily apparent from the following descriptions of the drawings and exemplary embodiments.

DETAILED DESCRIPTION OF EXEMPLARY EMBODIMENT(S)

The present invention is directed to a cellulosic composite material. More particularly, the present invention is directed to a siding panel or any other suitable component manufactured from the cellulosic composite material. Nevertheless, it should be recognized that the cellulosic composite material may be used as a substitute for natural wood as well as other cellulosic-filled and inorganic-filled polymer composites. For example, the cellulosic composite material of the present invention may be used to make interior and exterior decorative house moldings, picture frames, furniture, porch decks, deck railings, window moldings, window components, door components, roofing structures, building siding, and other suitable indoor and outdoor items. In addition, the cellulosic composite material may be used as a substitute for metal, vinyl, and other similar materials in order to make a variety of products.

Figure 1:
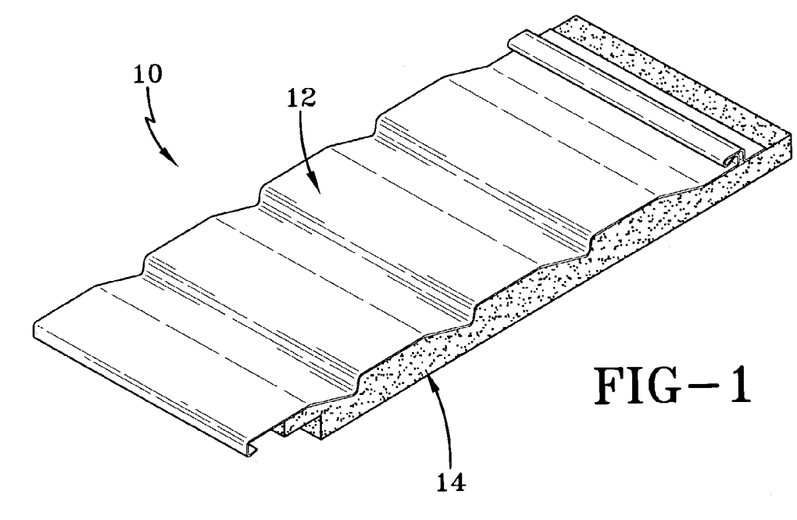
FIG. 1 is a perspective view of an exemplary embodiment of a siding panel of the present invention.
Figure 2:
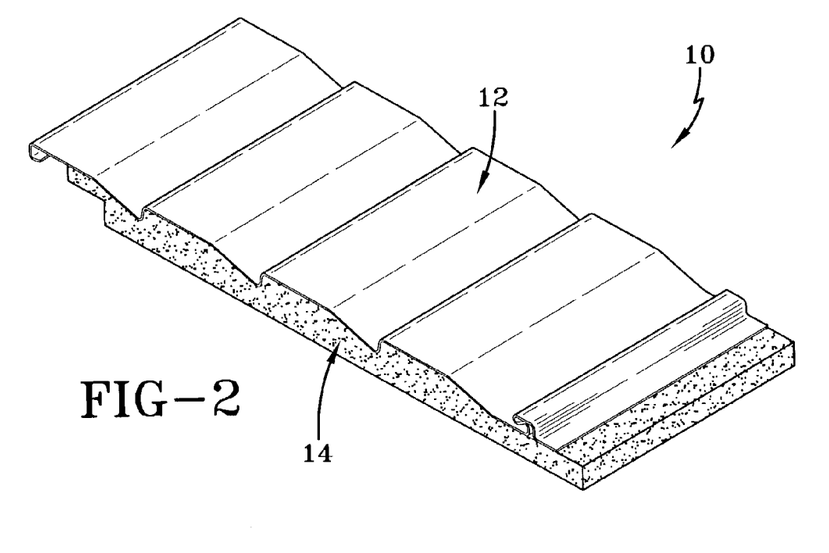
FIG. 2 is another perspective view of the siding panel of FIG. 1.

FIGS. 1 and 2 show an example of a siding unit 10 that can be made with a cellulosic composite of the present invention. In this example, the siding unit 10 is comprised of a siding panel 12. The siding panel 12 is comprised of two courses, i.e., four rows. However, it shall be understood that the siding panel 12 may be comprised of any desired number of rows or courses. In fact, the siding panel 12 may be shake siding or have any other desired shape including, but not limited to, the designs of all other known and future siding panels. It shall also be understood that a backer 14 may be secured to the inside of the siding panel 12. The backer 14 may be comprised of a sufficiently rigid insulating material such as expanded or extruded polystyrene foam, fiberglass, cardboard, a fire retardant grade of polyurethane foam, or any other similar, suitable, or conventional material.

The materials that may be used to make the cellulosic composite of the present invention include, but are not limited to, cellulosic fillers, polymers, inorganic fillers, cross-linking agents, lubricants, process aids, stabilizers, accelerators, inhibitors, enhancers, compatibilizers, blowing agents, foaming agents, thermosetting materials, and other suitable materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, and other similar materials. Examples of polymers include multilayer films, high density polyethylene (HDPE), low density polyethylene (LDPE), CPE, polypropylene (PP), PVC, chlorinated polyvinyl chloride (CPVC), acrylonitrile butadiene styrene (ABS), ethyl-vinyl acetate, other similar copolymers, other similar, suitable, or conventional thermoplastic materials, and formulations that incorporate any of the aforementioned polymers. Examples of inorganic fillers include talc, calcium carbonate, kaolin clay, magnesium oxide, titanium dioxide, silica, mica, barium sulfate, and other similar, suitable, or conventional materials. Examples of cross-linking agents include polyurethanes, such as isocyanates, phenolic resins, unsaturated polyesters, epoxy resins, and other similar, suitable, or conventional materials.

Combinations of the aforementioned materials are also examples of cross-linking agents. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials.

One embodiment of the present invention is a cellulosic/PVC composite material. The composite material may include at least one cellulosic filler in the amount of about 15% to about 35% by weight, more preferably about 20% to about 30% by weight. The composite may also include a PVC material in the amount of about 65% to about 85% by weight, more preferably about 70% to about 80% by weight.

An example of the cellulosic filler is wood flour. In an exemplary embodiment of the present invention, the wood flour has a mesh size between about 40 and about 60. The wood flour may be selected from any desired type of wood including, but not limited to, oak and pine.

The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight. In addition, it should be recognized that an in-line compounding and extrusion system may be utilized to eliminate a pre-drying step.

The PVC material can be made by mixing a PVC resin, at least one stabilizer, at least one lubricant, at least one process aid, and optional other ingredients in a mixer. An example of a mixer is a high intensity mixer such as those made by Littleford Day Inc. or Henschel Mixers America Inc. The type of mixer may be selected to blend the ingredients at desired temperatures. After mixing, the ingredients of the PVC material may be cooled to a desired temperature.

The PVC material may include PVC resin in an amount of about 20 to about 70% by weight of the composite material, more preferably about 30 to about 60% by weight of the composite material, still more preferably about 40 to about 50% by weight of the composite material. In an exemplary embodiment, the inherent viscosity of the PVC resin may be between about 0.6 and 1.1 and more preferably between about 0.7 and 0.9. The PVC material may also include CPE in an amount of 0 to about 40% by weight of the composite material, more preferably about 5 to about 30% by weight of the composite material, still more preferably about 10 to about 20% by weight of the composite material. Stabilizer(s) may also be included in an amount of about 0.5 to about 4% by weight of the composite material, more preferably about 1 to about 3% by weight of the composite material. The lubricant(s) may be present in an amount of about 1 to about 8% by weight of the composite material, more preferably about 2.5 to about 5% by weight of the composite material. The process aid(s) may be included in an amount of about 0.5 to about 5% by weight of the composite material, more preferably about 1 to about 3% by weight of the composite material. Also, the PVC material may include an inorganic filler in an amount of 0 to about 15% by weight of the composite material, more preferably about 2 to about 10% by weight of the composite material.

The cellulosic filler(s) and the PVC material may be mixed together prior to being further processed such as by extrusion, injection molding, or compression molding. For example, a low intensity mixer or any other suitable, similar, or conventional mixer may be used to mix the cellulosic filler(s) and the PVC material. An example of a low intensity mixer is a ribbon blender. Alternatively, the cellulosic filler(s) may be combined with the PVC material in a high intensity mixer or any other similar, suitable, or conventional mixer.

The cellulosic composite material may be processed in an extruder, a compression molding apparatus, an injection molding apparatus, or any other suitable, similar, or conventional apparatus. The inventors have surprisingly discovered that the pliability of some embodiments of the cellulosic composite of the present invention enables it to be used to make siding panels in a manner similar to vinyl siding. In other words, some embodiments of the cellulosic composite may be made into siding panels using a typical system for making vinyl siding. For instance, an example of an extruder is a conical, twin screw, counter-rotating extruder with a vent. A force feed hopper or crammer or any other suitable, similar, or conventional apparatus may be used to feed the materials into the extruder. The composite material may be extruded through at least one die. The die system may include a fold-up die to make a substantially flat panel. Optionally, the panel may then be embossed to provide the desired appearance. Thereafter, the panel may be bent into the desired shaped of the siding panel. For instance, the panel may be pulled through at least one sizer or calibrator to form the panel into the desired shape and thickness. Then, after the composite has cooled, a backer may be applied using an adhesive such as, but not limited to, neoprene, reactive polyurethane, or hot melt PSA.

Bending the cellulosic composite after it has passed through the die system is in contrast to conventional cellulosic composite manufacturing systems in which the composite exits a die system in the final shape of the desired component. While the composites of the present invention may be used in conventional cellulosic composite manufacturing systems to make various components, the inventors have surprisingly discovered that the improved pliability of some composites of the present invention also enable these composites to be shaped after leaving a die system. As a result, these composites of the present invention may be used in typical systems for making vinyl siding.

EXAMPLES

Example 1 of a panel was made using a cellulosic composite of the present invention. This example of the cellulosic composite comprised the following ingredients:

| Ingredient | Approximate Amount by Weight |
| --- | --- |
| 60 Mesh Wood Flour | 25% |
| PVC resin | 31% |
| CPE resin | 31% |
| Stabilizer(s) | 2% |
| Lubricant(s) | 4% |
| Process Aid(s) | 2% |
| Inorganic Filler | 6% |

Example 2 of a panel was made using a cellulosic composite of the present invention. This example of the cellulosic composite comprised the following ingredients:

| Ingredient | Approximate Amount by Weight |
| --- | --- |
| 60 Mesh Wood Flour | 25% |
| PVC resin | 46% |
| CPE resin | 15% |
| Stabilizer(s) | 2% |
| Lubricant(s) | 4% |
| Process Aid(s) | 2% |
| Inorganic Filler | 6% |

Example 3 of a panel was made using a cellulosic composite of the present invention. This example of the cellulosic composite comprised the following ingredients:

| Ingredient | Approximate Amount by Weight |
| --- | --- |
| 60 Mesh Wood Flour | 25% |
| PVC resin | 62% |
| Stabilizer(s) | 2% |
| Lubricant(s) | 4% |
| Process Aid(s) | 2% |
| Inorganic Filler | 6% |

Example 4 of a panel was made using a cellulosic composite of the present invention. This example of the cellulosic composite comprised the following ingredients:

| Ingredient | Approximate Amount by Weight |
| --- | --- |
| 40 Mesh Wood Flour | 25% |
| PVC resin | 31% |
| CPE resin | 31% |
| Stabilizer(s) | 2% |
| Lubricant(s) | 4% |
| Process Aid(s) | 2% |
| Inorganic Filler | 6% |

Example 5 of a panel was made using a cellulosic composite of the present invention. This example of the cellulosic composite comprised the following ingredients:

| Ingredient | Approximate Amount by Weight |
| --- | --- |
| 40 Mesh Wood Flour | 25% |
| PVC resin | 46% |
| CPE resin | 15% |
| Stabilizer(s) | 2% |
| Lubricant(s) | 4% |
| Process Aid(s) | 2% |
| Inorganic Filler | 6% |

Example 6 of a panel was made using a cellulosic composite of the present invention. This example of the cellulosic composite comprised the following ingredients:

| Ingredient | Approximate Amount by Weight |
| --- | --- |
| 40 Mesh Wood Flour | 25% |
| PVC resin | 62% |
| Stabilizer(s) | 2% |
| Lubricant(s) | 4% |
| Process Aid(s) | 2% |
| Inorganic Filler | 6% |

Each of the exemplary embodiments of the panel was made using extrusion equipment and techniques as set forth herein. Each of the exemplary panels was between about 50 and about 75 mils thick. The qualities of the resultant products are shown in the following tables. As Tables 1, 2, and 3 indicate, the ingredients of the cellulosic composite may be varied in order to enhance the physical characteristics for exterior siding. Likewise, it should be recognized that the blending temperatures, times, and order of the manufacturing process may be varied without departing from the scope of the present invention.

TABLE 1

(Impact Test Data)

| Example | IN/LB | Thickness (in) | VHIT (inlb/mil) |
| --- | --- | --- | --- |
| 4 | 24 | 0.070 | 0.34 |
| 5 | 16 | 0.072 | 0.22 |
| 6 | 8 | 0.074 | 0.11 |

TABLE 2

COE

| | $\times 10^{-5}$ in/in °F. | AVG |
| --- | --- | --- |
| EXAMPLE 1 | | |
| Sample 1 | 2.36 | 2.38 |
| Sample 2 | 2.40 | |
| EXAMPLE 3 | | |
| Sample 1 | 1.60 | 1.65 |
| Sample 2 | 1.69 | |
| EXAMPLE 4 | | |
| Sample 1 | 2.22 | 2.21 |
| Sample 2 | 2.20 | |
| EXAMPLE 5 | | |
| Sample 1 | 2.01 | 1.97 |
| Sample 2 | 1.93 | |
| EXAMPLE 6 | | |
| Sample 1 | 1.70 | 1.70 |
| Sample 2 | 1.70 | |

HDT

| | °C. | AVG | °F. |
| --- | --- | --- | --- |
| EXAMPLE 1 | | | |
| Sample 1 | 56.3 | 57.1 | 135 |
| Sample 2 | 57.9 | | |
| EXAMPLE 2 | | | |
| Sample 1 | 65.8 | 65.9 | 151 |
| Sample 2 | 66.0 | | |
| EXAMPLE 3 | | | |
| Sample 1 | 67.8 | 68.4 | 155 |
| Sample 2 | 69.0 | | |
| EXAMPLE 4 | | | |
| Sample 1 | 55.6 | 51.0 | 124 |
| Sample 2 | 46.3 | | |
| EXAMPLE 5 | | | |
| Sample 1 | 64.8 | 65.0 | 149 |
| Sample 2 | 65.2 | | |
| EXAMPLE 6 | | | |
| Sample 1 | 68.1 | 68.2 | 155 |
| Sample 2 | 68.2 | | |

TABLE 2-continued

| | VICAT | | |
|---|---|---|---|
| | °C. | AVG | °F. |
| EXAMPLE 1 | | | |
| Sample 1 | 79.7 | 79.7 | 175 |
| Sample 2 | 79.7 | | |
| EXAMPLE 2 | | | |
| Sample 1 | 90.1 | 89.1 | 192 |
| Sample 2 | 88.0 | | |
| EXAMPLE 3 | | | |
| Sample 1 | 108.5 | 109.4 | 229 |
| Sample 2 | 110.2 | | |
| EXAMPLE 4 | | | |
| Sample 1 | 80.6 | 80.5 | 177 |
| Sample 2 | 80.4 | | |
| EXAMPLE 5 | | | |
| Sample 1 | 88.2 | 88.1 | 190 |
| Sample 2 | 87.9 | | |
| EXAMPLE 6 | | | |
| Sample 1 | 102.3 | 106.0 | 223 |
| Sample 2 | 109.7 | | |

TABLE 3

| | Peak Load lb. | Peak Stress PSI | % strain @ Peak Load % | Modulus PSI |
|---|---|---|---|---|
| Example 1 | | | | |
| Sample 1 | 19.3 | 2953 | 4.9 | 153,196 |
| Sample 2 | 18.5 | 2855 | 4.8 | 149,914 |
| Sample 3 | 18.7 | 2917 | 4.6 | 152,958 |
| AVG | 18.8 | 2908 | 4.8 | 152,023 |
| Example 2 | | | | |
| Sample 1 | 29.5 | 6284 | 2.5 | 487,936 |
| Sample 2 | 31.7 | 6692 | 2.6 | 518,560 |
| Sample 3 | 32.5 | 6548 | 2.6 | 500,536 |
| AVG | 31.2 | 6508 | 2.6 | 502,344 |
| Example 4 | | | | |
| Sample 1 | 16.2 | 2517 | 4.4 | 134,840 |
| Sample 2 | 15.4 | 2584 | 4.5 | 138,697 |
| Sample 3 | 13.5 | 2442 | 4.6 | 134,836 |
| AVG | 15.0 | 2514 | 4.5 | 136,124 |
| Example 5 | | | | |
| Sample 1 | 29.4 | 5722 | 2.9 | 397,082 |
| Sample 2 | 28.0 | 5563 | 3.0 | 396,446 |
| Sample 3 | 29.3 | 5767 | 3.0 | 401,989 |
| AVG | 28.9 | 5684 | 3.0 | 398,506 |
| Example 6 | | | | |
| Sample 1 | 48.6 | 9379 | 2.4 | 729,622 |
| Sample 2 | 48.8 | 9511 | 2.4 | 716,083 |
| Sample 3 | 48.6 | 9479 | 2.3 | 731,295 |
| AVG | 48.7 | 9456 | 2.4 | 725,667 |

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A siding panel made from a composite material, said composite material comprising:
    cellulosic filler in an amount of about 15 to about 35% by weight of said composite material;
    PVC resin in an amount of about 20 to about 70% by weight of said composite material; and
    chlorinated polyethylene in an amount not exceeding about 40% by weight of said composite material.

2. The siding panel of claim 1 wherein the thickness of said siding panel is between about 0.050 and about 0.075 inch.

3. The siding panel of claim 1 wherein said cellulosic filler is at least about 40 mesh wood flour.

4. The siding panel of claim 1 wherein said cellulosic filler is in an amount of about 20 to about 30% by weight of said composite material.

5. The siding panel of claim 4 wherein said cellulosic filler is in an amount of about 25% by weight of said composite material.

6. The siding panel of claim 1 wherein said PVC resin is in an amount of about 30 to about 60% by weight of said composite material.

7. The siding panel of claim 6 wherein said PVC resin is in an amount of about 40 to about 50% by weight of said composite material.

8. The siding panel of claim 2 wherein said stabilizer is in an amount of about 1 to about 3% by weight of said composite material.

9. The siding panel of claim 2 wherein said lubricant is in an amount of about 2.5 to about 5% by weight of said composite material.

10. The siding panel of claim 2 wherein said process aid is in an amount of about 1 to about 3% by weight of said composite material.

11. The siding panel of claim 1 wherein said chlorinated polyethylene is in an amount of about 5 to about 30% by weight of said composite material.

12. The siding panel of claim 11 wherein said chlorinated polyethylene is in an amount of about 10 to about 20% by weight of said composite material.

13. The siding panel of claim 1 wherein said composite material further comprises inorganic filler in an amount up to about 15% by weight of said composite material.

14. The siding panel of claim 13 wherein said inorganic filler is in an amount of about 2 to about 10% by weight of said composite material.

15. The siding panel of claim 1 further comprising a reinforcement backer secured to said composite material.

16. The siding panel of claim 15 wherein said reinforcement backer is comprised of extruded or expanded polystyrene foam.

17. The siding panel of claim 15 wherein said reinforcement backer is secured to said composite material by an adhesive selected from the group consisting of neoprene, urethanes, and pressure sensitive hot melt adhesives.

18. A component made from a composite material, said composite material comprising:
- cellulosic filler in an amount of about 20 to about 30% by weight of said composite material;
- PVC resin in an amount of about 30 to about 60% by weight of said composite material;
- chlorinated polyethylene in an amount of about 5 to about 30% by weight of said composite material; and
- inorganic filler in an amount not exceeding about 15% by weight of said composite material.

19. The component of claim 18 wherein said PVC resin is in an amount of about 40 to about 50% by weight of said composite material.

20. The component of claim 18 wherein said chlorinated polyethylene is in an amount of about 10 to about 20% by weight of said composite material.

21. The component of claim 18 wherein said inorganic filler is in an amount of about 2 to about 10% by weight of said composite material.

22. The component of claim 18 wherein said component is selected from the group consisting of siding panels, siding accessories, interior and exterior decorative house moldings, picture frames, furniture components, deck components, deck railings, window moldings, window components, window lineals, door components, roof components, fence components, fence posts, fence rails, and floor components.

23. The component of claim 18 wherein said component is made by a process selected from the group consisting of extrusion, compression molding, and injection molding.

24. A component made from a composite material, said composite material comprising:
- cellulosic filler in an amount of about 20 to about 30% by weight of said composite material; and
- an alloy in an amount of about 70 to about 80% by weight of said composite material, said alloy comprising PVC and chlorinated polyethylene;
  - wherein said chlorinated polyethylene is in an amount of about 5 to about 30% by weight of said composite material.

25. The component of claim 24 wherein said chlorinated polyethylene is in an amount of about 10 to about 20% by weight of said composite material.

26. The component of claim 24 further comprising a reinforcement backer secured to said composite material.

27. The component of claim 24 wherein said component is selected from the group consisting of siding panels, siding accessories, interior and exterior decorative house moldings, picture frames, furniture components, deck components, deck railings, window moldings, window components, window lineals, door components, roof components, fence components, fence posts, fence rails, and floor components.

28. The component of claim 26 wherein said component is made by a process selected from the group consisting of extrusion, compression molding, and injection molding.

29. The siding panel of claim 1 wherein said composite material further comprises:
- stabilizer in an amount of about 0.5 to about 4% by weight of said composite material;
- lubricant in an amount of about 1 to about 8% by weight of said composite material; and
- process aid in an amount of about 0.5 to about 5% by weight of said composite material.

30. The component of claim 18 wherein said composite material further comprises:
- stabilizer in an amount of about 1 to about 3% by weight of said composite material;
- lubricant in an amount of about 2.5 to about 5% by weight of said composite material; and
- process aid in an amount of about 1 to about 3% by weight of said composite material.

31. A component made from a composite material, said composite material comprising:
- cellulosic filler in an amount of about 15 to about 35% by weight of said composite material; and
- an alloy in an amount of about 65 to about 85% by weight of said composite material, said alloy comprising PVC and chlorinated polyethylene;
  - wherein said chlorinated polyethylene is in an amount of about 5 to about 40% by weight of said composite material.

32. The component of claim 31 wherein said chlorinated polyethylene is in an amount of about 5 to about 30% by weight of said composite material.

33. The component of claim 32 wherein said chlorinated polyethylene is in an amount of about 10 to about 20% by weight of said composite material.

34. The component of claim 31 further comprising a reinforcement backer secured to said composite material.

35. The component of claim 31 wherein said component is a siding panel.

36. The component of claim 31 wherein the thickness of said component is between about 0.050 and about 0.075 inch.

37. The component of claim 31 wherein said cellulosic filler is in an amount of about 20 to about 30% by weight of said composite material.

38. The component of claim 31 wherein said PVC is in an amount of about 20 to about 70% by weight of said composite material.

39. The component of claim 38 wherein said PVC is in an amount of about 30 to about 60% by weight of said composite material.

40. The component of claim 39 wherein said PVC is in an amount of about 40 to about 50% by weight of said composite material.

* * * * *

UNITED STATES PATENT AND TRADEMARK OFFICE
CERTIFICATE OF CORRECTION

PATENT NO. : 7,186,457 B1
APPLICATION NO. : 10/307083
DATED : March 6, 2007
INVENTOR(S) : Zehner et al.

It is certified that error appears in the above-identified patent and that said Letters Patent is hereby corrected as shown below:

On The Title page, Item (56), References Cited, OTHER PUBLICATIONS, please delete "Dalväg et al., The Efficient of Cellulosic Fillers in Common Thermoplastics. Part II. Filling with Processing Aids and Coupling Agents, 1985, vol. 11, pp. 9-38." and insert -- Dalväg et al., The Efficiency of Cellulosic Fillers in Common Thermoplastics. Part II. Filling with Processing Aids and Coupling Agents, 1985, vol. 11, pages 9-38. --

On The Title page, Item (56), References Cited, OTHER PUBLICATIONS, please delete "Myer et al., Bibliography: Composites from Plastics and Wood-Based Fillers, USDA Forest Products Laboratory, Madison, WI, pp. 1-27 odds (1991)." and insert -- Myers et al., Bibliography: Composites from Plastics and Wood-Based Fillers, USDA Forest Products Laboratory, Madison, WI, pages 1-27 odds (1991). --

On The Title page, Item (56), References Cited, OTHER PUBLICATIONS, please delete "Rogalski et al., Poly(Vinyl-Chloride) Wood Fiber Composites, ANTEX, 1987, pp. 1436-1441." and insert -- Rogalski et al., Poly(Vinyl-Chloride) Wood Fiber Composites, ANTEC, 1987, pages 1436-1441. --

On The Title page, Item (56), References Cited, OTHER PUBLICATIONS, please delete "Robson, D. et al., "A Comparison of Wood and Plant Fiber Properties", Woodfiber-Plastic Composites, 1995, pp. 41-46." and insert -- Robson, D. et al., "A Comparison of Wood and Plant Fiber Properties", Proceedings: Woodfiber-Plastic Composites, 1995, pp. 41-46. --

In column 8, line 38, please delete "siding panel of claim 2" and insert -- siding panel of claim 29 --.

In column 8, line 41, please delete "siding panel of claim 2" and insert -- siding panel of claim 29 --.

In column 8, line 44, please delete "siding panel of claim 2" and insert -- siding panel of claim 29 --.

UNITED STATES PATENT AND TRADEMARK OFFICE
CERTIFICATE OF CORRECTION

PATENT NO. : 7,186,457 B1
APPLICATION NO. : 10/307083
DATED : March 6, 2007
INVENTOR(S) : Zehner et al.

It is certified that error appears in the above-identified patent and that said Letters Patent is hereby corrected as shown below:

In column 9, line 52, please delete "component of claim 26" and insert -- component of claim 24 --.

Signed and Sealed this

Seventeenth Day of July, 2007

JON W. DUDAS
*Director of the United States Patent and Trademark Office*